(12) United States Patent
Piotrowski et al.

(10) Patent No.: US 8,317,049 B2
(45) Date of Patent: Nov. 27, 2012

(54) VACUUM BREAKER ARRANGEMENT WITH EXTERNALLY PROTRUDING COLLAPSIBLE VALVE PART

(75) Inventors: Thomas C. Piotrowski, West Chicago, IL (US); Christian A. Mutzbauer, Warrenville, IL (US)

(73) Assignee: The Protectoseal Company, Bensenville, IL (US)

( * ) Notice: Subject to any disclaimer, the term of this patent is extended or adjusted under 35 U.S.C. 154(b) by 1736 days.

(21) Appl. No.: 11/312,283

(22) Filed: Dec. 20, 2005

(65) Prior Publication Data

US 2007/0138189 A1    Jun. 21, 2007

(51) Int. Cl.
*B65D 51/16* (2006.01)
*B65D 90/22* (2006.01)
(52) U.S. Cl. .................. 220/231; 220/745; 220/203.11; 220/DIG. 33; 215/262
(58) Field of Classification Search ............ 220/203.01, 220/203.11, 209.09, 745, 231, DIG. 33; 137/846, 137/587, 81.1; 215/262
See application file for complete search history.

(56) References Cited

U.S. PATENT DOCUMENTS

| | | | |
|---|---|---|---|
| 2,298,938 A | 10/1942 | Griffin, Jr. et al. | |
| 3,422,844 A * | 1/1969 | Grise | 137/847 |
| 4,168,012 A | 9/1979 | Hawkinson | |
| 4,273,153 A * | 6/1981 | Brown | 137/454.5 |
| 4,971,219 A | 11/1990 | Dombeck et al. | |
| 5,249,598 A * | 10/1993 | Schmidt | 137/493.1 |
| 5,320,147 A | 6/1994 | Jamrog | |
| 5,640,999 A | 6/1997 | Wood | |
| 5,863,152 A | 1/1999 | Ingalls | |
| 6,325,240 B1 | 12/2001 | Gruber | |
| 6,554,150 B2 | 4/2003 | Foltz | |
| 6,866,056 B1 | 3/2005 | Scott | |

OTHER PUBLICATIONS

The Protectoseal Company, Fuel Tank Safety Caps with Flash Arrester, brochure, 1997, 4 pp., The Protectoseal Company, Bensenville, Illinois.

* cited by examiner

*Primary Examiner* — Robin Hylton
(74) *Attorney, Agent, or Firm* — Olson & Cepuritis, Ltd.

(57) ABSTRACT

A vacuum breaker arrangement for use with a container includes body parts holding a resilient valve member captive. The valve member includes an intermediate body part, intermediate and enlarged head and a valve part. The valve part is made of resilient material which defines an internal passageway communicating with an opening in the body parts. The valve part includes an end portion defining a slit which is closed at a first pressure and which is automatically opened at a second, reduced pressure.

14 Claims, 6 Drawing Sheets

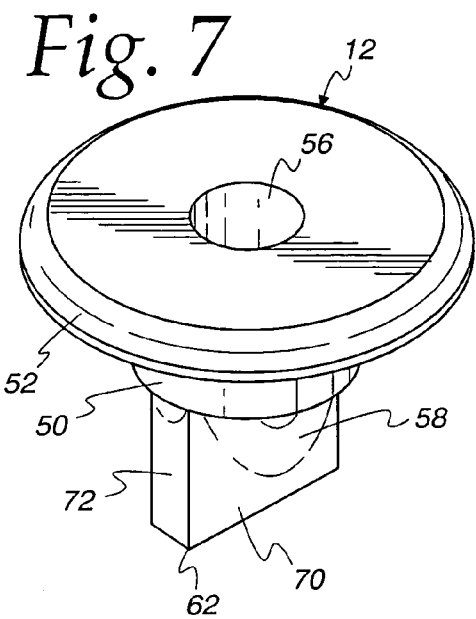
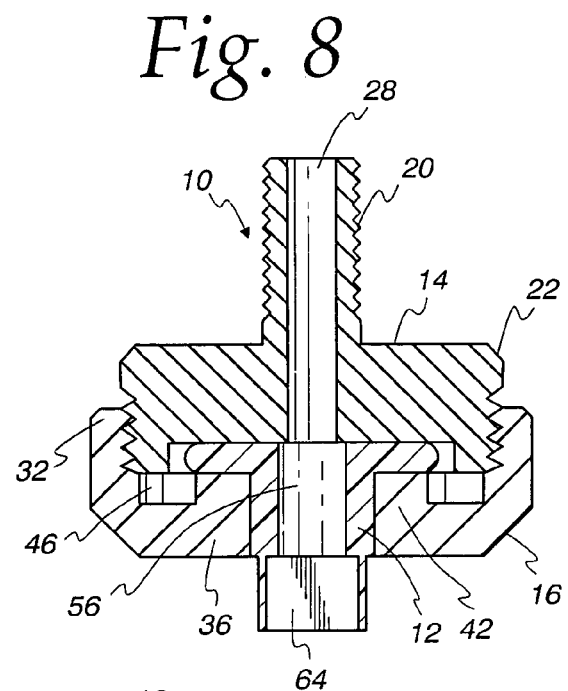
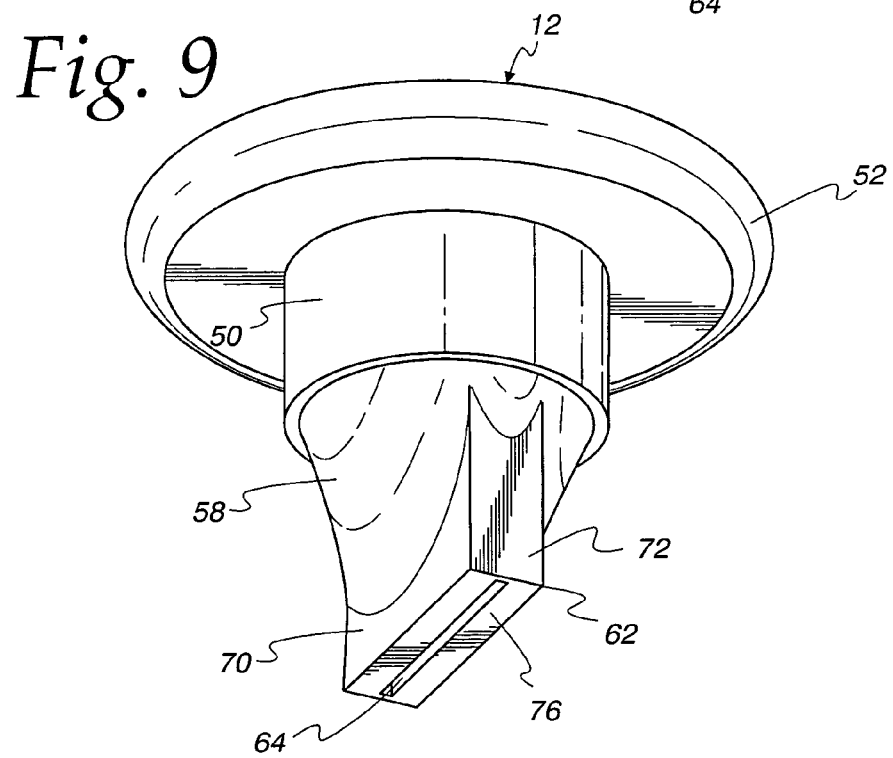

VACUUM BREAKER ARRANGEMENT WITH EXTERNALLY PROTRUDING COLLAPSIBLE VALVE PART

FIELD OF THE INVENTION

The present invention relates to the field of safety equipment for the handling of volatile fluids, and in particular to vacuum breaker arrangements for use with fuel tank safety caps.

BACKGROUND OF THE INVENTION

Fuel tank safety caps are often provided, and are required in certain applications, to cover the fuel tank of gasoline or diesel powered vehicles or machinery. The caps must provide a secure closure for a filler neck or the like of a fuel tank, but must be readily openable, but lockable, as desired. In addition, a cap should include an automatic pressure relief mechanism to prevent pressure buildup within a fuel tank due to temperature rise of the fuel, or other factors. As fuel in the tank is consumed during operation of the vehicle or machinery, an increasing vacuum can develop within the tank which can impair operation of the engine by preventing efficient fuel flow.

Accordingly, it is desirable to provide both vacuum and pressure relief to prevent such occurrences. Further, as time goes on, additional environmental regulations, safety requirements and other regulatory restraints are placed on this type of equipment. Thus, it would be desirable to accommodate ongoing design modifications into existing equipment, without requiring the substantial costs associated with new castings and molds, for example.

SUMMARY OF THE INVENTION

The present invention relates to a vacuum breaker device for use with a container, such as a fuel tank, to provide automatic relief of a vacuum that may develop within the container, while preventing unintentional emissions of tank contents to the surrounding atmosphere.

The device comprises a housing including first and second housing parts which cooperate to define an internal cavity and a flow path communicating with the cavity and extending through the housing. A control member defines a flow passageway communicating with the flow path. The control member is partially disposed in the cavity and includes a resiliently collapsible valve part protruding from the housing and communicating with the flow passageway for closing the flow passageway (in one instance, under the presence of ambient pressure) and automatically opening the flow passageway when the ambient pressure is reduced. The housing and the control member cooperate to locate the valve part within the container.

The present invention encompasses different design types, each of which can use an inexpensive resilient valve member comprising the control member. For example, a resilient valve member of one design type defines an internal passageway through which vacuum in a container is relieved. The internal passageway is closed off by an end portion which includes a slit. In a first design, the slit is normally closed by resilient forces stored in the resilient material of the valve member. In a second design, the slit is closed by external pressure forces within the container which overcome resilient forces stored in the valve member.

In another aspect, the invention relates to vacuum breaker, for use with a container, comprising a closure having a body portion defining an opening, an arm hingedly connected to the body portion and a cap defining an aperture and carried by the arm so the cap is movable towards and away from the opening. A housing includes first and second housing parts which cooperate to define an internal cavity and a flow path that communicates with the cavity and extends through the housing. A control member defines a flow passageway communicating with the flow path. The control member is partially disposed in the cavity and includes a resiliently collapsible valve part protruding from the housing and communicating with the flow passageway so as to close the flow passageway and to automatically open when the ambient pressure is reduced. The housing includes a mounting for the cap to bring the flow path into communication with the cap aperture.

In a further aspect, the invention relates to a control member for use with a vacuum breaker for automatically controlling pressure within a container, and operable between a closed position at a first pressure and an open position at a second, reduced pressure. The control member comprises an intermediate body portion, a resiliently collapsible valve part, an enlarged head for accurately positioning the valve part with respect to an external housing and an end portion including the valve part. The intermediate body portion is disposed between the enlarged head and the end portion. The intermediate body portion and the enlarged head cooperate to define a continuous flow passageway extending through at least a major portion of the control member. The portion of the flow passageway defined by the valve part comprises a slit. In one instance, the valve part, at the first pressure, comprises an elongated slit of generally zero opening area, the slit being closed by resilient forces stored in resilient material forming the valve part. In another instance, the valve part is made of resilient material and the slit has a nonzero area when at rest, being closed in the presence of a positive pressure which overcomes resilient forces stored in the material.

The vacuum breaker arrangement of the present invention provides a number of advantages. For instance, vacuum breaker arrangements can be economically formed from a minimum number of inexpensive parts. In one preferred embodiment, the entire vacuum breaker arrangement can be formed from three parts, two interengaging housing portions encasing a monolithic molded resilient control member. The housing portions can be readily adapted for attachment to a wide variety of fuel tank or other container devices.

In addition, vacuum breaker arrangements according to the present invention can have a compact size. Accordingly, the present vacuum breaker arrangements can provide easy retrofit upgrades to a wide variety of existing container equipment. By selecting known resilient materials for the control member, a wide variety of fuels or other container contents can be accommodated.

In view of its relatively simple construction, a vacuum breaker arrangement according to the present invention can provide reliable automatic valving operation without requiring complicated assemblies of mechanical parts.

BRIEF DESCRIPTION OF THE DRAWINGS

In the drawings:

FIG. 7 is a schematic perspective view of the resilient valve member;

FIG. 8 is a cross-sectional view taken along the line 8-8 of FIG. 1;

FIG. 9 is another perspective view of the resilient valve member;

DETAILED DESCRIPTION OF THE PREFERRED EMBODIMENTS

Figure 1:
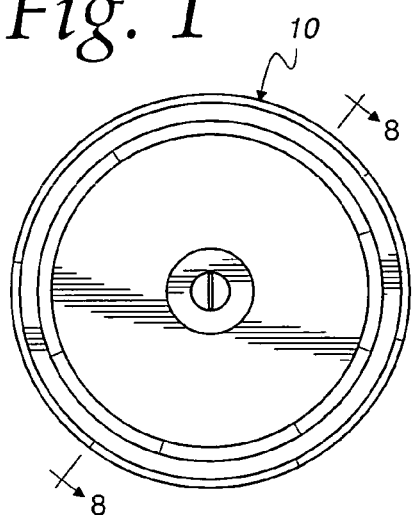
FIG. 1 is a schematic top plan view of a vacuum breaker arrangement according to principles of the present invention.

The invention disclosed herein is, of course, susceptible of embodiment in many different forms. Shown in the drawings and described hereinbelow in detail are preferred embodiments of the invention. It is understood, however, that the present disclosure is an exemplification of the principles of the invention and does not limit the invention to the illustrated embodiments.

For ease of description, fuel tank safety equipment utilizing a vacuum breaker arrangement embodying the present invention is described below in its usual assembled position as shown in the accompanying drawings, and terms such as upper, lower, horizontal, longitudinal, etc., may be used herein with reference to this usual position. However, the fuel tank safety equipment may be manufactured, transported, sold or used in orientations other than and described and shown herein.

As will be seen herein, different types of apparatus embodying the present invention are described. Generally speaking, FIGS. 1-11, which will be described first, are directed to a less preferred embodiment which requires an external positive pressure to provide vacuum seal closure. FIGS. 12-15 are directed to a more preferred embodiment which does not require an external positive pressure to close off the vacuum seal. Although generally less preferred, the arrangement described with reference to FIGS. 1-11 may be more attractive in certain applications.

Figure 2:
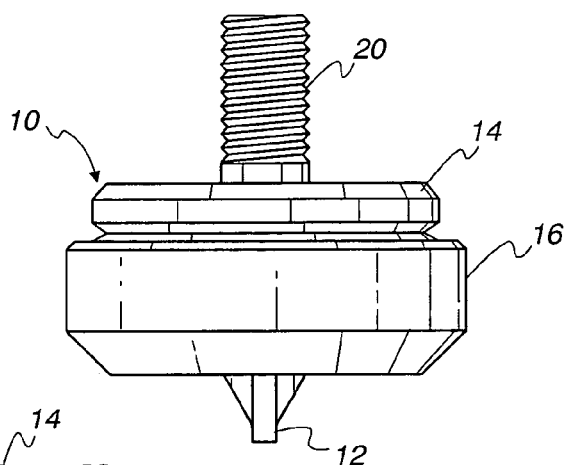
FIG. 2 is a side elevational view thereof.
Figure 3:
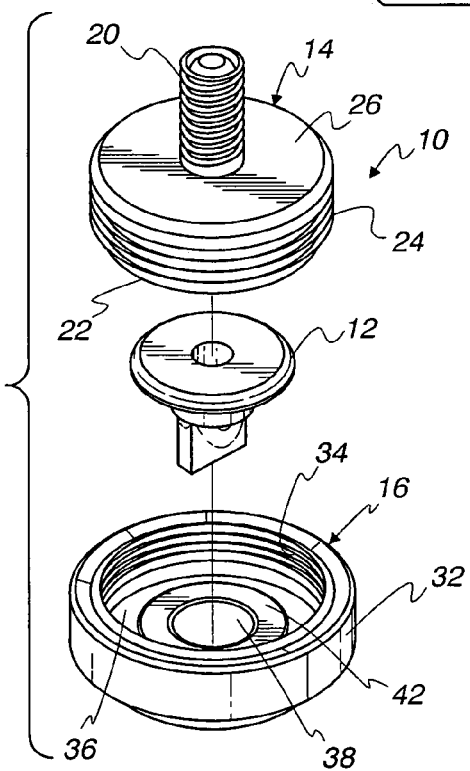
FIG. 3 is an exploded perspective view thereof showing the resilient valve member.

Referring to FIGS. 1 and 2, apparatus embodying the present invention provides a vacuum breaker arrangement generally indicated at 10 for providing vacuum relief to a container or sealed closure, such as a fuel tank. One embodiment of the vacuum breaker arrangement comprises a housing for enclosing, holding captive, and precisely positioning a closure member or resilient valve member 12. Referring to FIGS. 1-3 and 8, the housing preferably comprises a two-part selectively engageable and disengageable assembly of a first housing part 14 and a second housing part 16. In one example, the first and second housing parts 14, 16 are threadably engageable one with the other, although other selective engagement/disengagement arrangements for the housing parts can be provided. For example, the first and second housing parts can be engageable with a conventional bayonet lock.

Preferably, the first housing part 14 comprises a mount or threaded stem 20 extending from a body portion 22 having external threads 24 for a sealed mounting to a container, and an end wall 26. As can be seen in FIG. 8, the threaded stem 20 has an axial bore or passageway 28 which also extends through the body portion 22. In one example, the first and second housing parts 14, 16 are made of a rigid material such as a metal, metal alloy or plastic. The housing parts 14, 16 may be formed by conventional machining or conventional molding processes, as may be desired. The choice of material for the housing parts 14, 16 (and other components of the valve arrangement) will, of course, reflect compatibility with their surrounding environment. For example, when the vacuum breaker assembly is employed with a fuel tank, materials for the housing members 14, 16 are preferably impervious to fuel or fuel vapor. Although the present invention can be used with fuel tanks, it should be understood that the vacuum breaker assembly can be employed with virtually any type of sealed closure or container or other apparatus for which an automatic vacuum release is desired.

The second housing part 16 is, in one example, cup-shaped including an outer wall 32 defining a series of internal threads 34. An end-wall 36 cooperates with outer wall 32 to form a hollow interior, and wall 36 defines a central aperture 38. In one example, the central aperture 38 is surrounded with an optional raised ring portion 42 cooperating with the end wall 36 and side wall 32 to form an annular recess 46 as can be seen in FIG. 8. As indicated in FIG. 8, the housing parts 14, 16 are threadingly engaged one with the other in a manner which is also illustrated in FIG. 2. As can be seen in FIG. 8, housing parts 14, 16 when engaged with one another, form an interior cavity communicating with a flow path extending along the axial center line of the housing assembly. As indicated in FIG. 8, this internal cavity within the housing assembly receives resilient valve member 12, preferably with a snug, secure fit which firmly holds the resilient member in place within the housing. If desired, the housing parts and resilient valve member can be dimensioned for a relatively loose fitting arrangement of the resilient valve member within the housing assembly.

In the preferred embodiment illustrated in the Figures, a two-part housing assembly is utilized with the first and second housing parts both including a recess for receiving portions of the resilient valve member so as to retain the resilient valve member in position and so as to hold the resilient valve member securely captive during operation of the vacuum break assembly. If desired, other arrangements can be provided. For example, a one or two piece housing can be employed with an opening for receiving the resilient valve member which can be held captive, if desired, by a retainer clip or the like in a conventional arrangement.

Figure 4:
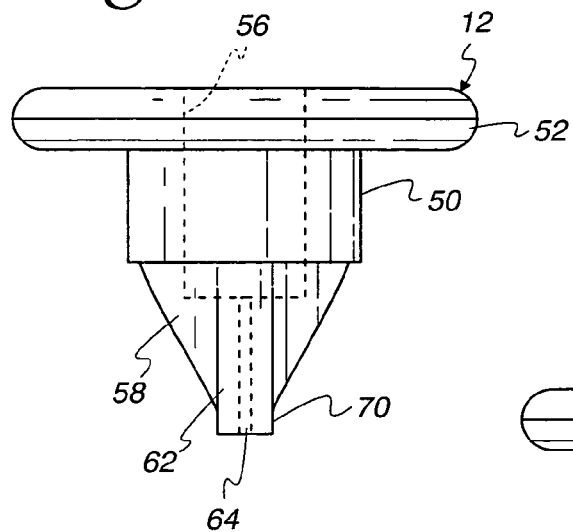
FIG. 4 is a side elevational view of the resilient valve member.
Figure 5:
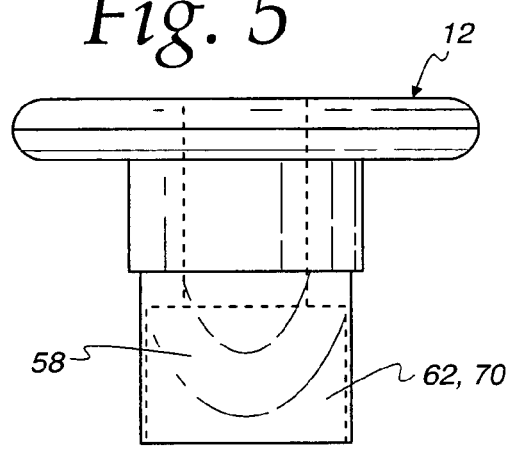
FIG. 5 is a schematic front elevational view of the resilient valve member.
Figure 6:
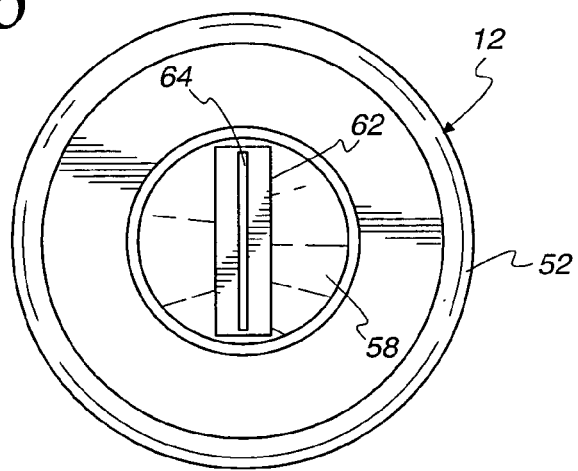
FIG. 6 is a schematic bottom plan view of the resilient valve member.

Referring to FIGS. 4-9, resilient valve member 12 includes an intermediate body portion 50 and an enlarged head 52, both of which define an axial bore 56. Referring to FIG. 4, for example, resilient valve member 12 further includes a body portion 58 extending from intermediate body part 50. In a preferred embodiment, resilient valve member 12 is formed as an integral unit, preferably by conventional molding techniques. If desired, the resilient valve member could be constructed from individual parts secured together by an appropriate adhesive or the like. If desired, the parts of resilient valve member 12 described thus far could be made of a semi-rigid or rigid material, if desired.

Referring to the lower portion of FIG. 4, resilient valve member 12 further includes an end portion with a control member or valve part 62 defining an interior slot or passageway 64 which communicates with axial bore 56. The valve part 62 is formed to be resiliently collapsible under the application of external pressure, so as to seal off the lower end opening of slot 64. The valve part 62, in view of its resilient construction, automatically opens when ambient pressure is reduced. In a preferred embodiment, the entire resilient member 12 is entirely formed of a resilient material for manufacturing efficiency. However, only the valve part 62 and most preferably the free end of the valve part need be made of resilient material to be resiliently collapsible.

Referring to now to FIGS. 4-7 and 9, and especially to FIG. 9, valve part 62 of the illustrated preferred embodiment has a generally rectangular plinth-like configuration, the lower part of which is exposed, free of body part 58. In the illustrated preferred embodiment, body part 58 comprises rounded, generally part-conical sections overlying the larger side surfaces 70 of valve part 62 as can be seen, for example, in FIGS. 5, 7 and 9. In the illustrated preferred embodiment, the smaller side surfaces 72 are also exposed, free of body part 58. As can be seen in FIG. 9, valve part 62 has a free end surface 76 which is generally rectangular, having thicker portions 80 at the major sides 70 and relatively thinner portions 82 at the smaller sides 72. Together, the thick and thin portions 80, 82 define the rectangular slot 64.

Referring again to FIG. 11, in operation, as positive pressure is developed across the exposed portions of the exterior of resilient valve part 62, the relatively thick portions 80 are deflectable towards one another so as to seal off slot 64 under the application of external pressure. If desired, the relatively thin portions 82 can be made to flex or otherwise operate as a hinge to further allow the relatively thicker portions 80 to be brought towards one another under the application of external pressure. In order to enhance the resilient deflection of valve part 62 under the application of external pressure, substantial portions of the valve part in the most preferred embodiment are exposed, free of body part 58. Accordingly, if desired, body part 58 can be regarded as a stiffener which reduces the tendency of valve part 62 to collapse under a given amount of external pressure.

Various modifications may be made to resilient valve member 12, depending upon the choice of materials employed in constructing the resilient valve member. For example, in a preferred embodiment, the resilient valve member 12 is formed as a single unit of resilient material such as a resilient plastic or a rubber compound. Depending on the amount of resilience of the material, an effective pressure rating can be established for closing of the slotted passageway 64. In one example, with resilient valve member 12 formed of a rubber compound, the durometer value of the rubber compound is matched with one or more of several factors, including: the dimensions of the valve part 62, the relative thicknesses of the end parts 80, 82, the amount of surface exposure of valve part 62 and the relative size and location of the stiffener body parts 58. For example, if the material of valve part 62 is relatively inflexible and still resilient to some extent, the wall portions 80 can be made with a reduced thickness and/or the wall portions 82 can also be reduced in thickness to increase the ability of the valve part to become compressed under the application of a predetermined external pressure. With relatively inflexible material, action of valve part 62 can also be enhanced by increasing its exposure, i.e. reducing the size of the stiffener body parts 58 so as to allow a greater surface area exposure to external pressure.

On the other hand, if the material of valve part 62 is relatively soft and deflectable or compressible, the closing action of the valve part can be retarded by increasing the thicknesses of wall portions of 80 and/or 82 and decreasing the exposed surface area of surface portions 70.

Although body parts 58 are shown with a rounded, generally part conical configuration, they can be replaced with one or more ribs or the like extending along the surfaces 70. If desired, the ribs can have a generally constant thickness throughout as opposed variable thickness that may be desired in certain instances.

As can be seen, for example, in FIG. 8, a continuous passageway is formed throughout the entire vacuum breaker arrangement. That is, the axial bore 28 in housing part 14, the central bore 56 in resilient valve part 12 and the slotted passageway 64 and the resilient valve part all communicate with one another to form a continuous passageway. As can be seen in FIG. 2, the lower end of resilient valve member 12 is exposed, protruding from the housing parts 14, 16. As the exposed portion of resilient valve member 12 is acted upon by an external pressure, the slotted passageway 64 is closed off, thus closing the resilient valve member, and blocking flow through the vacuum breaker arrangement 10. As positive pressure is reduced to a lower positive pressure value or a negative pressure (i.e. vacuum) value, the inherent resilience of valve part 62 opens the slotted passageway 64, thus allowing flow through the vacuum breaker arrangement.

Figure 10:
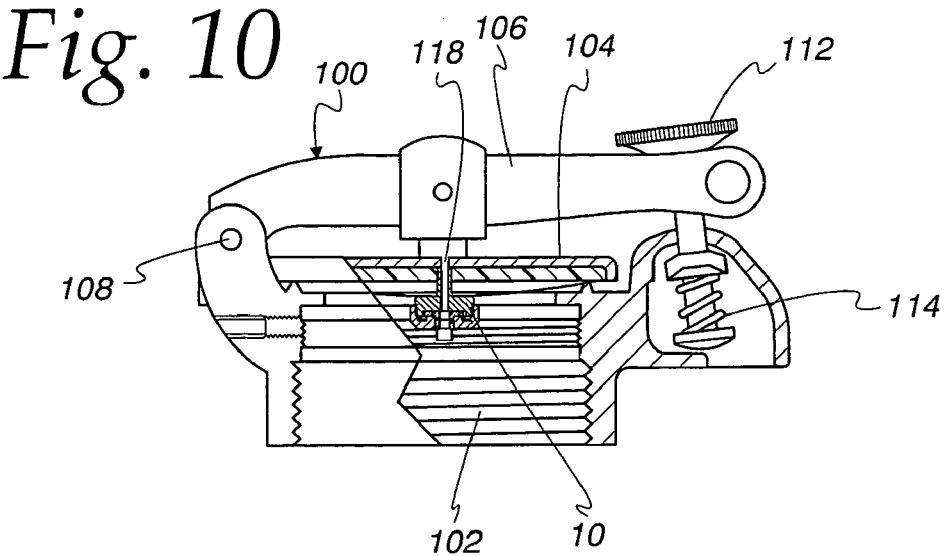
FIG. 10 is a schematic elevational view of a fuel tank safety cap according to principles of the present invention.
Figure 11:
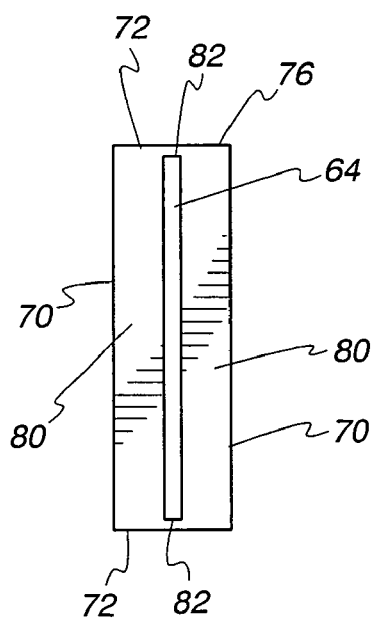
FIG. 11 is a schematic plan view of the bottom end portion of the resilient valve member.

Referring now to FIG. 10, vacuum breaker arrangement 10 is shown installed in a conventional closure or fuel tank safety cap generally indicated at 100. Fuel tank safety cap 100 is largely of a conventional design commercially available, for example, from The Protectoseal Company of Bensenville, Ill. in a variety of different configurations. The fuel tank safety cap includes a lower threaded body portion 102 defining an axial opening closed off by a hinged, closing cap 104 carried on an arm 106 which is hinged at 108 to the threaded body part 102. A spring loaded handle 112 engages the free end of arm 106 and applies a compressive, closing force via compression spring 114. The cap 104 defines a hole 118 which communicates with a threaded bore that receives the threaded stem 20 of vacuum breaker arrangement 10. Thus, with vacuum breaker arrangement 10 in an open position, flow is permitted from an ambient region outside of the fuel tank safety cap through the cap and the resilient valve part.

As will be appreciated, vacuum breaker arrangement 10 provides an automatic operation, valving on and off in response to changes in pressure surrounding the exposed portion of resilient valve member 62. As mentioned, the vacuum breaker arrangement according to principles of the present invention has an immediate commercial application for use with fuel tank safety caps. Accordingly, as fuel is removed from a fuel tank connected to fuel tank safety cap 100, a reduced positive pressure and/or a negative pressure is applied to the exterior of, and most preferably the exposed portion of valve part 62, allowing the valve to open, relieving the reduced positive or negative pressure within the fuel tank. As pressure is equalized with ambient conditions, pressure in the fuel tank, or at least in the head space within the fuel tank, is increased and the slotted passageway 64 is pinched off or otherwise closed so as to prevent fuel tank vapors from being released to the atmosphere.

Referring now to FIGS. 12-15, a resilient valve member 150 has features resembling those of resilient valve member 12, described above. As mentioned above, resilient valve member 12 has a slot opening 64 of a small but finite size (see for example FIG. 6). In contrast, with reference to FIG. 14, the resilient valve member 150 has a slit 152 which preferably has a negligible, and most preferably a zero size. That is, the bottom end face 154 of valve part 158 is substantially continuous and effectively unbroken, despite zero area slit 152.

Preferably, resilient valve member 150 is made of one piece monolithic resilient material such as rubber or rubber composition which is molded into a unitary form. Slit 152 is preferably formed by piercing valve part 158 with a sharp blade, but, owing to the resilient composition of the valve member, the slit is substantially "healed," with the sidewalls 156 of valve part 158 being resiliently pressed together at a bottom end face 154, so as to close off the bottom end of an internal cavity 160 (see FIG. 13).

Figure 12:
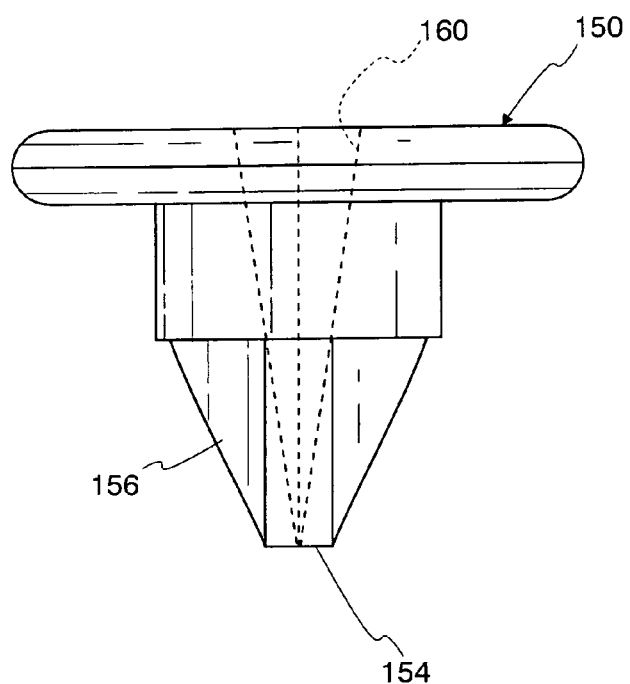
FIG. 12 is a side elevational view of another resilient valve member.
Figure 13:
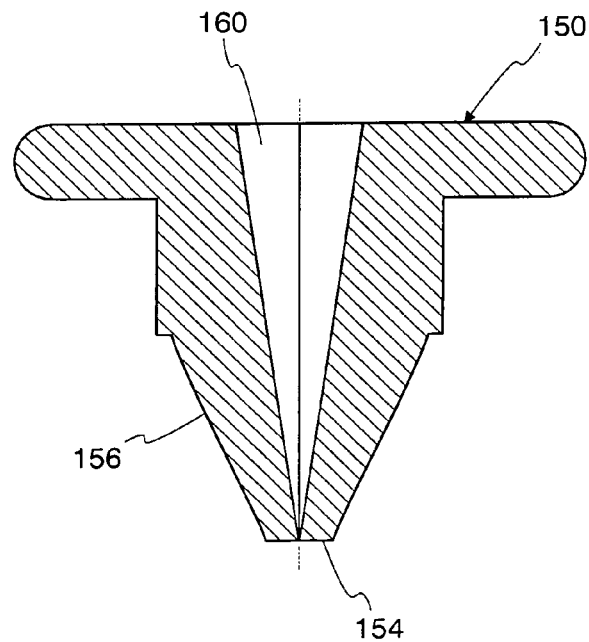
FIG. 13 is a cross-sectional view of the resilient valve member of FIG. 12.
Figure 14:
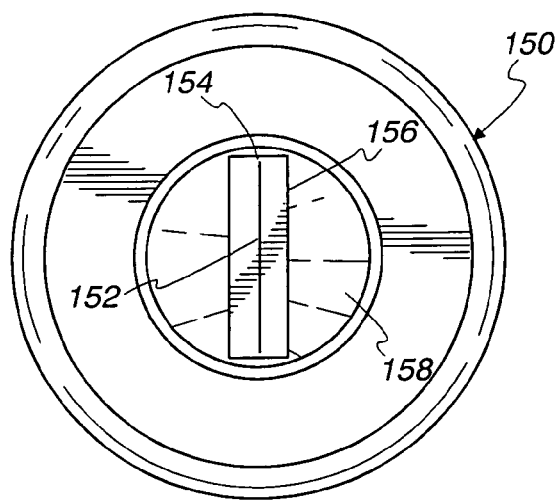
FIG. 14 is a schematic bottom plan view of the resilient valve member of FIG. 12.
Figure 15:
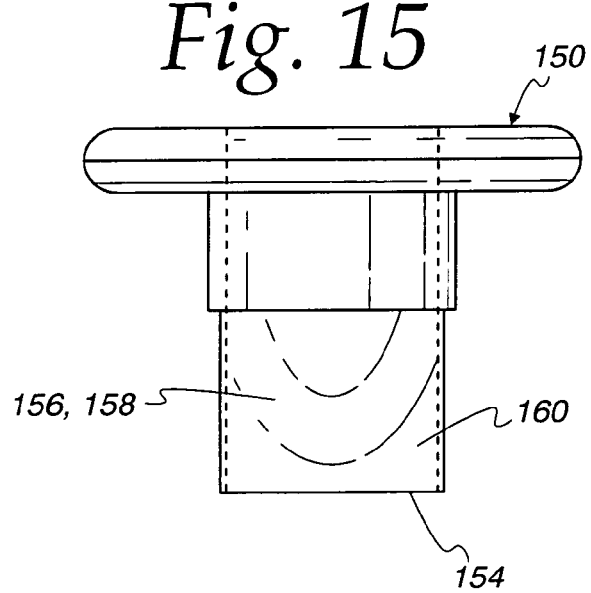
FIG. 15 is a front elevational view of the resilient valve member of FIG. 12.

As can be seen in FIG. 14, the slit 152 is elongated, with the internal cavity 160 being generally wedge-shaped. Other shapes, such as conical can also be employed, if desired. As can be seen in FIGS. 12, 13 and 15, internal cavity 160 is formed with continuous smooth wall portions throughout, and is substantially free of discontinuities, such as the internal stepped wall of resilient valve member 12. Accordingly, the internal cavity 160 of resilient valve member 150 can be more readily and more economically formed. Further, internal vacuum forces within a container, which are applied to valve part 158, are resolved in the resilient material in a more uniform fashion, owing to the substantially continuous interior walls forming internal cavity 160.

With resilient valve members constructed according to FIGS. 12-15, a positive action vacuum seal is guaranteed, even in low pressure environments, and is attractive, for example, where zero emissions of tank contents must be assured. The bottom end of internal cavity 160 is normally pinched off until the internal bias forces of the resilient material are overcome by rising vacuum levels developed within the container, to allow the side walls 156 of vacuum part 158 to separate at the lower end, thereby giving slit 152 a nonzero opening area.

The foregoing descriptions and the accompanying drawings are illustrative of the present invention. Still other variations and arrangements of parts are possible without departing from the spirit and scope of this invention.

What is claimed is:

1. A vacuum breaker for use with a container, comprising:
   a housing including first and second housing parts cooperating so as to define an internal cavity and a flow path communicating with the cavity and extending through the housing;
   a control member defining a flow passageway communicating with the flow path, the control member partially disposed in the cavity and having a resiliently collapsible valve part protruding externally from the internal cavity and free of the housing and communicating with the flow passageway so as to close the flow passageway and to automatically open when the ambient pressure is reduced; and
   the housing and the control member cooperating so as to locate the externally exposed protruding valve part within the container associated therewith so that the protruding valve part, in response to changes in ambient pressure surrounding the valve part, maintains the flow passageway closed when the ambient pressure exerted thereon is positive, automatically opens when the ambient pressure in the container is reduced to thereby break the resulting vacuum, and automatically re-closes when the ambient pressure in the container equalizes with the external ambient pressure.

2. The vacuum breaker according to claim 1 wherein the housing further includes a mount for sealed mounting to the container.

3. The vacuum breaker according to claim 1 wherein the control member is formed of a single unitary body of a resilient material.

4. The vacuum breaker according to claim 1 wherein the valve part has an end face defining an elongated slit.

5. The vacuum breaker according to claim 4 wherein the valve part is made of resilient material such that the slit is substantially closed by resilient forces stored in the resilient material.

6. The vacuum breaker according to claim 5 wherein the flow passageway is generally wedge-shaped.

7. The vacuum breaker according to claim 1 wherein the valve part, when free of external pressure, has an end face defining an open slit of positive area communicating with the flow passageway.

8. The vacuum breaker according to claim 1 wherein the first and second housing parts are releasably interengageable one with the other.

9. The vacuum breaker according to claim 1 wherein the first and second housing parts are threadably and releasably interengageable one with the other.

10. A vacuum breaker for use with a container, comprising:
    a closure having a body portion defining an opening, an arm hingedly connected to the body portion and a cap defining an aperture and carried by the arm so as to be movable toward and away from the opening;
    a housing including first and second housing parts cooperating so as to define an internal cavity and a flow path communicating with the cavity and extending through the housing;
    a control member defining a flow passageway communicating with the flow path, the control member partially disposed in the cavity and having a resiliently collapsible valve part protruding externally from the internal cavity and free of the housing and communicating with the flow passageway so as to close the flow passageway and to automatically open when the ambient pressure is reduced in the container;
    the housing and the control member cooperating so as to locate the externally exposed protruding valve part within the container associated therewith so that the protruding valve part, in response to changes in ambient pressure surrounding the valve part, maintains the flow passageway closed when the ambient pressure exerted thereon is positive, automatically opens when the ambient pressure in the container is reduced to thereby break the resulting vacuum, and automatically re-closes when the ambient pressure in the container equalizes with the external ambient pressure; and
    the housing including a mounting for mounting to the cap so as to bring the flow path into communication with the cap aperture.

11. The vacuum breaker according to claim 10 wherein the closure includes a closure mounting for releasable interengagement with the container.

12. The vacuum breaker according to claim 10 wherein the closure includes a closure mounting for threadingly releasable interengagement with the container.

13. The vacuum breaker according to claim 10 wherein the closure further includes a knob carried on the closure body portion for releasable interengagement with the arm.

14. The vacuum breaker according to claim 13 wherein the knob is resiliently mounted to the closure body portion.

* * * * *